E. R. DUGAN.
SCREEN FOR MOTION PICTURES.
APPLICATION FILED MAR. 8, 1918.
1,293,380.
Patented Feb. 4, 1919.
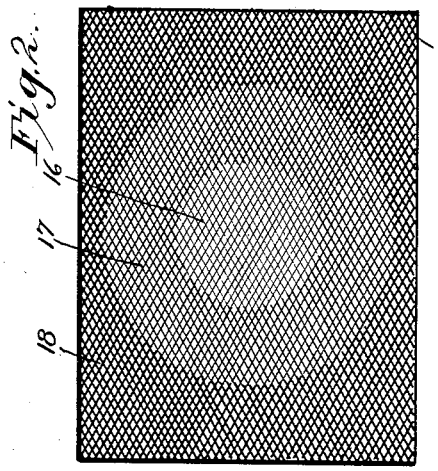
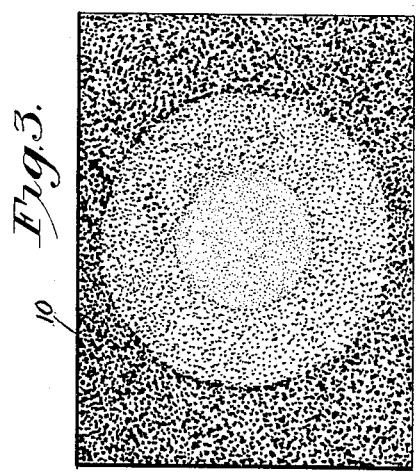
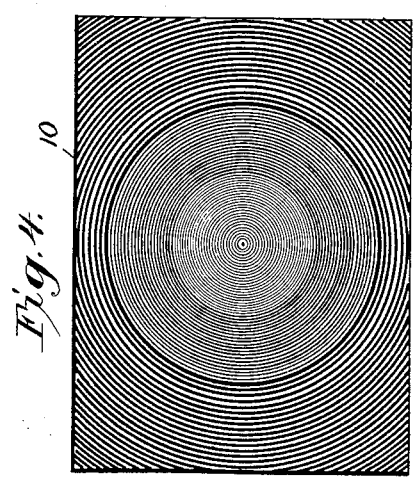
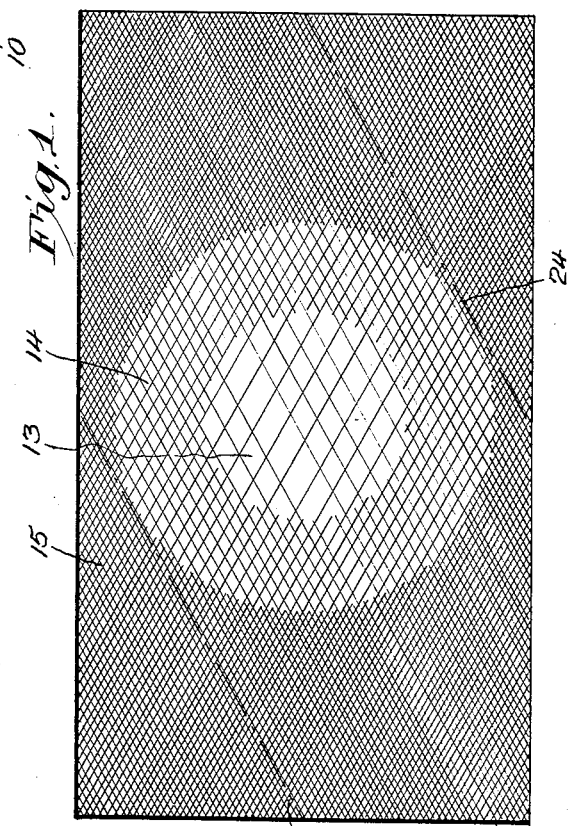
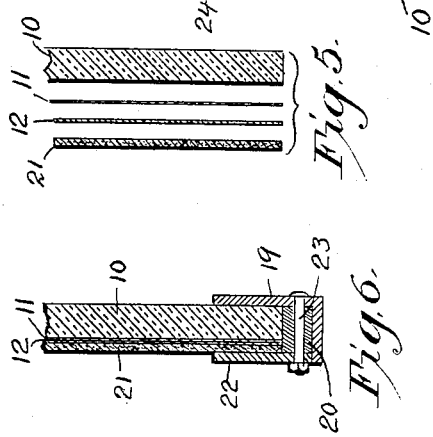
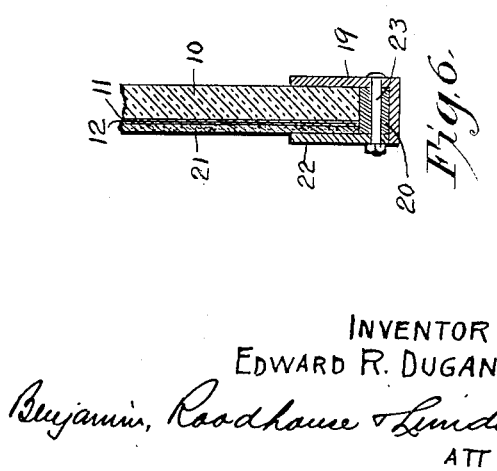
INVENTOR
EDWARD R. DUGAN
ATTYS.

UNITED STATES PATENT OFFICE.

EDWARD R. DUGAN, OF CHICAGO, ILLINOIS.

SCREEN FOR MOTION-PICTURES.

1,293,380.  Specification of Letters Patent.  Patented Feb. 4, 1919.

Application filed March 8, 1918. Serial No. 221,250.

*To all whom it may concern:*

Be it known that I, EDWARD R. DUGAN, a citizen of the United States, and resident of Chicago, in the county of Cook and State of Illinois, have invented certain new and useful Improvements in Screens for Motion-Pictures, of which the following is a specification.

My invention has relation to image receiving screens and especially to screens for use in receiving the image of projected pictures such as are employed in motion picture theaters whereon the animated images projected from the projecting apparatus are viewed.

Screens for viewing motion pictures usually present images that are wanting in plasticity and have the appearance of being flat and are what is photographically known as "shallow" or without depth; that is, there appears to be no "relief" effects. Numerous attempts have been made to produce these effects through the employment of the stereoscopic principle in taking and projecting the animated images, but none of these, so far as I am aware, have been successful, owing to the failure to overcome the parallax. It is also well known that the central portion of the projected picture, which is in the optical axis of the lens system of the apparatus, is much clearer and sharper than the portions around or adjacent the border or edge of the screen. I have discovered that by employing a screen made of some suitable transparent material that is coated upon its back or rear surface with a substance having more or less reflective properties, a greater brilliancy and depth to the picture is obtained. And in order to diffuse the light reflected from the back and prevent its interference with the projected picture, I score or etch the front face or surface of the material of which the screen is made with parallel striations.

Thus it will be seen that one of the objects of my invention is the provision of a screen that will improve the character of the projected pictures by adding depth to the scenes. Another object is the provision of a screen that tints the high-lights of the pictures projected thereon so that desirable and pleasing effects may be obtained without coloring the film in its manufacture. And further objects are the provision of a screen that is simple and easy to construct, comparatively inexpensive to produce, and which materially increases the appearance of the pictures.

I prefer to carry out my invention in substantially the manner hereinafter described, reference being now had to the accompanying diagrams and drawings, that form a part of this specification which illustrate divers embodiments of my invention.

In the drawings,

Figure 1, is a diagrammatic view of a screen constructed in pursuance with the preferred form of my invention.

Figs. 2, 3 and 4 are similar views of slightly modified constructions.

Fig. 5, is a fragmentary transverse section showing the elements of the structure separated.

Fig. 6, is a fragmentary section illustrating one form of frame and manner of assembling the screen.

Referring particularly to Figs. 1, 5 and 6, of the drawings, it will be observed that my improved screen preferably comprises a piece of plate glass 10 of the dimensions usually employed for a screen in motion picture theaters or the like that has its rear face or back surfaced with a metallic coating 11 of gold leaf or oriental tissue, or a suitable material of reflective properties and the latter covered and protected by a coat of light absorbing opaque or black paint 12. For the purpose of diffusing and breaking up the rays of light reflected from the metallic coating 11 and preventing them leaving the exterior surface or front of the glass plate 10, I prefer to striate or score the exterior surface so that the reflected light rays will not pass through the same. I have found that the provision of the parallel striations or scorings, whether the same be crossed or in one direction only, assists in materially enhancing the plastic effects secured and this plastic effect is again somewhat increased when such a reflective surface is employed as will lend some color to the image. This scoring I prefer to accomplish by subjecting the glass to the action of an abrading wheel of emery or carborundum and to extend the scoring diagonally from corner to corner of the plate 10. I also prefer to have the scoring disposed in zones as illustrated in Figs. 1 and 2 of the drawings so that the lightest or faintest zone 13 will occupy the central area of the plate, the next concentric zone 14 will be slightly heavier, while the heaviest or densest zone 15 will occupy the remaining portion of the screen. In Fig. 1, the zones are distinguished by making all the scoring of the same width, but in the central zone 13, they are wider apart than in the concentric zone 14, while in the outer zone 15, the scoring is very much closer together. In Fig. 2, I have modified this method by making the central zone 16, of fine lines, the concentric zone 17 of slightly heavier lines, while in the exterior zone 18, the scoring is the heaviest. This is still further modified in Fig. 3, by increasing the coarseness of the grinding from the central portion of the plate where it is lightest, toward the outside edges of the plate where it is heaviest. While I prefer to cross the scoring and dispose the same diagonally on the plate from corner to corner thereof, this particular arrangement may be modified in other ways. For instance, the striations may be concentric, as shown in Fig. 4, or spiral, as will be understood.

In mounting the screen in the theater, the plate may be placed in a frame of angle metal 19, with a filler 20, of wood or the like, between the edge of the glass plate and the horizontal flange of the frame, and a backing 21 provided of asbestos, or the like. A narrow clamping plate 22 will extend around the rear of the frame, thereby inclosing the edges of the plate in a metallic holder of substantially U-shape in cross-section, that is held together by suitable bolts 23, that pass through the vertical flanges of the angle metal 19, the fillers 20 and the clamp plate 22.

In the manufacture of a screen of this character, the metallic coating may be either leaf or paint, and in lieu of gold, I may employ silver aluminum, bronze or the like, but I prefer the use of gold or oriental tissue, because of its peculiar reddish tone which I have found desirable because it adds a flesh tint to the features of the persons appearing in the scenes projected upon the screen.

Owing to its size it may be found desirable or necessary to make the screen in sections and in this connection, I prefer to cut the glass obliquely as indicated by the broken lines 24 in Fig. 1 of the drawings in order that the joints will run parallel with the scoring that extends in the same direction.

While I have described the screen as made of glass, provided with a gold leaf or like backing, it may be made of amber, or other colored glass, and the gold leaf omitted, in which event a fabric backing is disposed against the rear surface of the glass.

What I claim is:—

1. An image receiving screen comprising a suitable material provided with parallel striations arranged in concentric zones of different degrees of accentuation.

2. An image receiving screen comprising a light refracting material having parallel striations thereon arranged in concentric zones of different degrees of accentuation.

3. An image receiving screen comprising a suitable transparent material, parallel striations provided upon the front surface thereof arranged in concentric zones of different degrees of accentuation.

4. An image receiving screen comprising light refracting material the front surface whereof is provided with concentric zones of grinding of different coarseness, and a reflective backing for said material.

5. An image receiving screen comprising light refracting material the front surface whereof is provided with grinding increasing in coarseness from the central portion to the edges of said material, and a reflective backing for said material.

Signed at Chicago, county of Cook, and State of Illinois, this 28th day of February, 1918.

EDWARD R. DUGAN.

Witnesses:
C. G. DUGAN,
SAM WEISMEHL.